Feb. 6, 1923.
W. D. BREWSTER.
CAR BRAKE OPERATING MECHANISM.
FILED FEB. 23, 1921.
1,444,104.
2 SHEETS—SHEET 1.
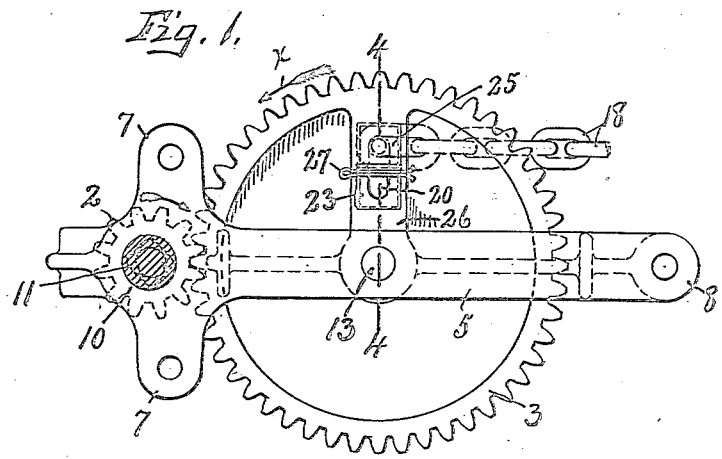
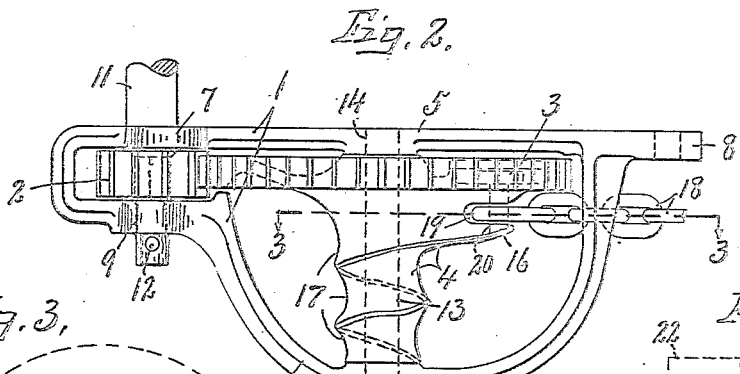
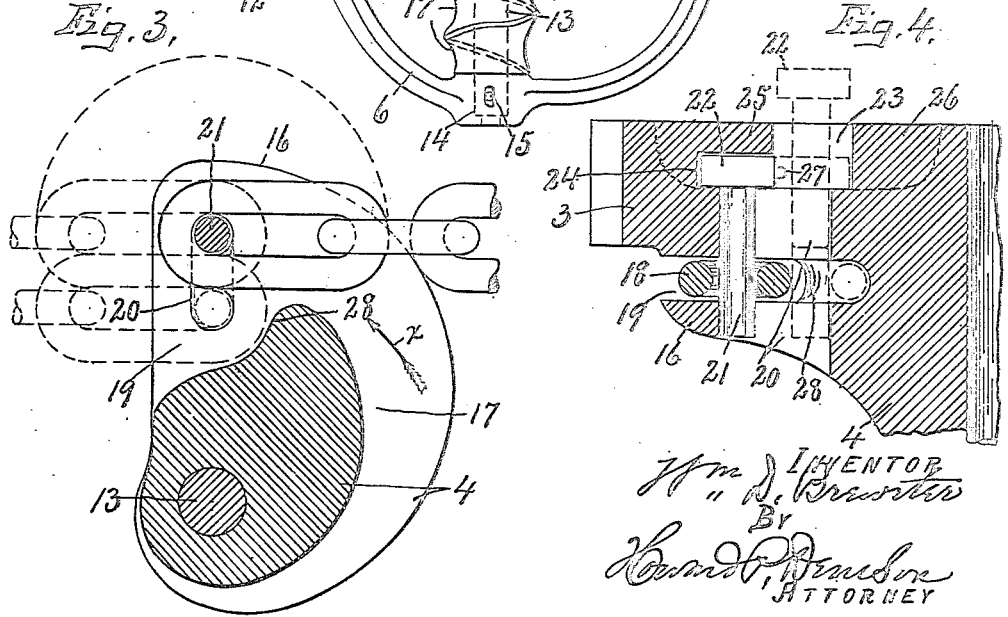

Feb. 6, 1923.
W. D. BREWSTER.
CAR BRAKE OPERATING MECHANISM.
FILED FEB. 23, 1921.
1,444,104.
2 SHEETS—SHEET 2.
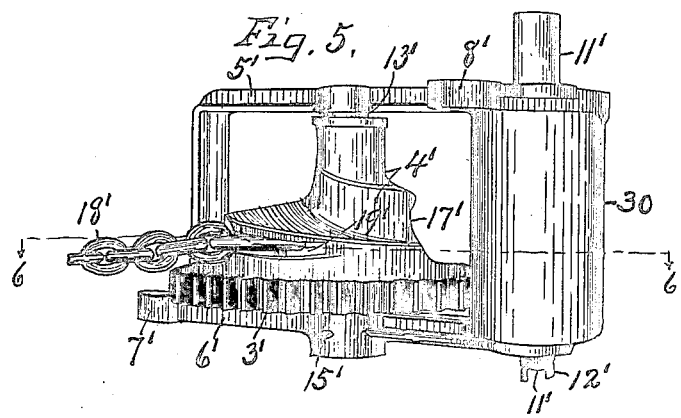
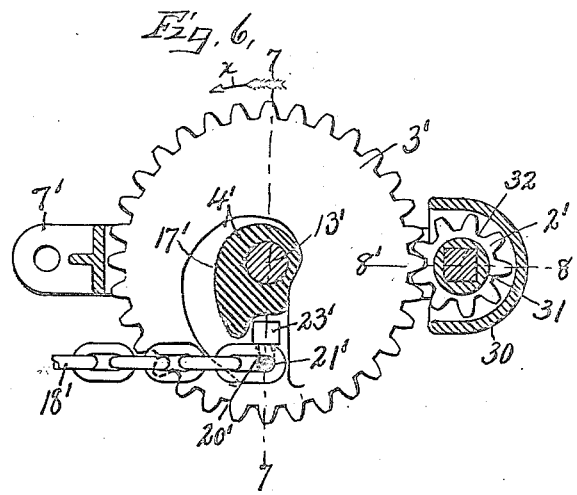
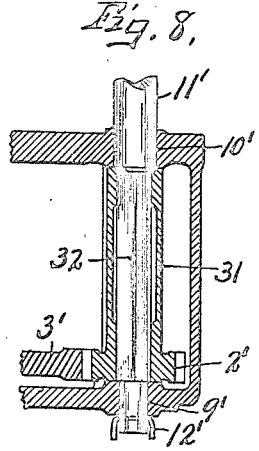
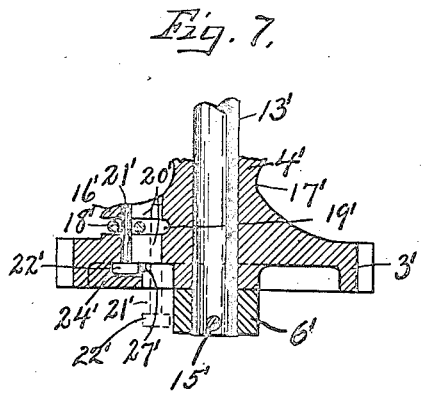

Patented Feb. 6, 1923.

1,444,104

UNITED STATES PATENT OFFICE.

WILLIAM D. BREWSTER, OF SYRACUSE, NEW YORK, ASSIGNOR TO NATIONAL BRAKE COMPANY INCORPORATED, OF BUFFALO, NEW YORK, A CORPORATION OF NEW YORK.

CAR-BRAKE-OPERATING MECHANISM.

Application filed February 23, 1921. Serial No. 447,166.

*To all whom it may concern:*

Be it known that I, WILLIAM D. BREWSTER, of Syracuse, in the county of Onondaga, in the State of New York, have invented new and useful Improvements in Car-Brake-Operating Mechanism, of which the following, taken in connection with the accompanying drawings, is a full, clear, and exact description.

This invention relates to certain improvements in hand operated car brakes involving the use of a chain or cable connection between a brake beam and suitable drum, having means by which the slack of the cable is quickly taken up by a slight turning movement of the drum followed by the tightening of the cable under gradually increasing power as the brakes are applied.

I am aware that various devices have heretofore been proposed for accelerating the take up of the slack of the chain or cable followed by the tightening of the chain to apply the brakes under gradually increasing power due to the spiral or conical shape of the drum to which the cable is attached, and while my present invention makes use of a device of the character, the main object is to provide a more secure and expeditious means of attachment of the cable to the drum and at the same time to prevent accidental displacement or detachment of the cable from the drum when the brake is in use.

Another object is to make the brake operating mechanism including its drum, gears and supporting frame therefor, as a unitary article of manufacture capable of being installed in different positions upon various constructions of cars without material alteration of the cars or standard brake beams used in connection therewith.

Other objects and uses relating to specific parts of the brake mechanism will be brought out in the following description:

In the drawings,

Fig. 1 is a plan view of simple form of freight-car brake operating means for attachment in a horizontal position to the under side of the end sills with the conical drum in a plane below that of the gears and in which the upright shaft or operating staff may extend to the top of the car.

Fig. 2 is a side elevation of the same device.

Figure 3 is an enlarged horizontal sectional view taken on line 3—3 Fig. 2.

Fig. 4 is an enlarged vertical sectional view taken on line 4—4, Fig. 1 except that the frame is omitted.

Fig. 5 is a perspective view of a similar brake operating mechanism adapted to be used on Pullman cars in which the conical drum is in the plane above that of the gears.

Fig. 6 is a horizontal sectional view of the same device taken approximately in the plane of line 6—6, Fig. 5.

Fig. 7 is a vertical sectional view taken in the plane of line 7—7, Fig. 6.

Fig. 8 is a vertical sectional view taken in the plane of line 8—8, Fig. 6.

As illustrated in Figs. 1 to 4 inclusive, the brake operating mechanism comprises a frame —1— for receiving and supporting a pair of intermeshing gears —2— and —3— and a conical drum —4—, said frame comprising upper and lower bars —5— and —6— of cast metal having their ends integrally united and their intermediate portions spaced apart to receive the gears —2— and —3— and conical drum —4— between them.

The upper bar —5— is provided near one end with oppositely projecting apertured lugs —7— for receiving bolts by which the frame is clamped to the under side of the end sill of a freight or similar car, the opposite end of the upper bar being also provided with a longitudinally extending apertured lug —8— to receive another clamping bolt for additional securement of the frame to the end sill of the car.

The ends of the lower and upper bars —5— and —6— above and below the pinion —2— are substantially parallel and are provided with vertically aligned bearings —9— and —10— for receiving and supporting the lower end of an upright shaft or staff —11— which may be extended to the top of the car and provided with the usual hand wheel for rotating the same, the bearing —10— and adjacent upper portion of the staff —11— being of somewhat larger diameter than the lower bearing —9— at the adjacent end of the staff which lower end extends downwardly beyond the bearing —9— and is provided with a transverse aperture for receiving the pin —12— by which the staff is held against upward displacement.

The portion of the shaft or staff —11— extending through the pinion and the opening of said pinion through which it extends are angular in cross section to transmit rotary motion from the shaft to the pinion as the shaft is rotated in reverse directions. The gear —3— is of a considerably larger diameter than that of the pinion —2— and is preferably formed integrally with the drum —4— but is disposed in a plane above said drum or in substantially the same horizontal plane as the pinion —2— with which it meshes so that the rotation of the pinion by the staff or shaft —11— will transmit similar but slow rotary motion to the gear and drum, the object being to establish a similar ratio of power in the operation of the brakes through the medium of a cable or chain connection between the brake beam and drum.

The ratio of the pinion —2— and gear —3— is approximately 1 to 4, while the ratio of the diameters of the gear —3— and drum —4— is approximately 4 to 1 which permits the application of the brake to cars under a maximum load with sufficient power to readily stop the car under its momentum with the use of a relatively small hand wheel on the operating staff or shaft —11—.

The gear —3— and drum —4— are coaxial and are journaled upon a shaft or spindle —13— having its opposite ends secured in suitable bearings —14— in the lower and upper bars —6— and —5— respectively, said shaft or pin being held against rotation by a pin —15— extending diametrically through the lower end of the shaft —13— and opposite sides of the adjacent bearing —14— as shown in Fig. 2.

As previously stated, the drum —4— is conical with its larger end adjacent the gear —3— and eccentric to the axis of the spindle —13— to form an eccentric arm —16— of relatively long radius, the periphery of said arm and remaining portions of the drum being grooved at —17— to form a spiral bearing, the radius of which gradually reduces toward the lower end of the drum.

The chain or cable —18— may be connected at one end in any well known manner to a brake beam not shown, the opposite end of the chain being connected in the manner hereinafter described to the outer end of the eccentric arm —16— which when the drum is rotated serves to accelerate the take up of any slack in the chain and to cause the latter to gradually wind up upon the spiral groove —17— to prevent over lapping of the chain on the drum and also to enable the brakes to be applied with gradually increasing power as the rotation of the drum continues.

The outer end of the eccentric arm —16— is slotted horizontally at —19— to form a continuation of the spiral groove —17— and also to receive the adjacent end link of the chain —18—, the lower and upper walls of the slot constituting guide ledges for holding the adjacent link against vertical displacement.

The slot —19— is formed in the drum at its junction with the gear —3— so that the gear forms one side, in this instance the upper wall of the slot, and in order that the adjacent end of the chain —18— may be conveniently and expeditiously attached to the drum, the adjacent portion of the gear —3— is provided with a bolt opening —20— extending vertically from the lower side of the arm —16— through the top of the gear —3— transversely of and at right angles to the slot —19— to communicate therewith and thereby permit the bolt —21— to pass through the adjacent link of the chain and across said slot for engagement with the outer ends of the slot and thereby to establish a drawing connection between the chain and drum.

The portion of the bolt opening —20— adjacent to but at opposite sides of the slot —19— are substantially of the same width circumferentially of the drum as the diameter of the shank of the bolt —21— but is elongated radially a distance somewhat greater than the head as —22— of said bolt for a purpose presently described, the slot —19— being extended inwardly toward the center of the drum beyond the inner wall of the bolt opening —20—, a distance slightly greater than the diameter of one side of the link to allow said link to be moved inwardly a sufficient distance to register its opening with the shank of the bolt when the latter is inserted in the opening —20— close to the inner wall of the opening as shown by dotted lines in Figure 4.

The outer end of the opening —20—, in this instance at the top of the gear —3—, is enlarged at —23— to receive the head —22— of the bolt —21—, the vertical depth of this enlargement being greater than the vertical thickness of the head to allow the latter to be depressed some distance within the outer surface of the gear when adjusted for use in attaching the chain to the drum.

The bolt head —22— and enlargement —23— are preferably square, the enlargement being extended inwardly toward the center a sufficient distance to receive the head —22— when the shank of the bolt is engaged with the inner side of the opening —20—.

The enlargement —23— is provided with a radially extending branch opening —24— having its lower side substantially coincident with the lower side of the enlargement to form a seat for the head of the bolt, the vertical height of the branch opening —24— being approximately equal to the corresponding height of the head —22— but of less vertical height than the enlargement —23—, thereby forming a wall —25— overlying the head of the bolt when the latter is inserted in the opening and moved laterally or outwardly to the limit of its outer movement as shown in Fig. 4, thereby cooperating with the lower wall of the branch opening —24— to hold the bolt against endwise movement when adjusted for use.

The enlarged opening —23— and its branch —24— are formed in a raised rib —26— on the upper surface of the gear —3— so that the sides of the rib extends downwardly to approximately the bottom of the enlargement —23— and branch —24— for receiving a cotter key or pin —27— which is passed through apertures in the opposite walls of the enlargement —23— and across the inner face of the bolt head —22— to hold the bolt against inward displacement from the branch opening —24— when adjusted for use.

The inner wall of the slot —19— extends radially around and beyond the inner wall of the bolt opening —20— a distance therefrom corresponding approximately to the thickness of one side of the adjacent link of the chain —18— and is concentric with the produced axis of the enlargement —23— to form a cam-face —28— on the drum —4— at the side of said opening —20— opposite the direction of rotation of the drum as indicated by arrow X Figure 3, the object of which is to crowd the adjacent end of the chain and its attaching bolt —21— against the outer wall of the bolt opening —20— and thereby to avoid any strain upon the cotter pin —27— as the chain is wound upon the drum. That is, the end link of the chain is first inserted in the side of the slot —19— opposite the cam —28— to register its opening with the bolt —21— and to permit said bolt to pass therethrough when first inserted in the opening —20— as shown by dotted lines in Figure 4 whereupon the bolt with the link attached thereto is shifted radially to the outer end of the slot and locked in place by the cotter-pin —27— after which the attached link and remaining portions of the chain are swung about the axis of the bolt to the position shown by full lines, Figure 3 and attached to the brake beam, not shown, ready for operation in which position the chain will extend across the end of the cam —28— to be engaged thereby, as the drum is rotated, as indicated by arrow X for setting the brakes.

The construction shown in Figures 5 to 8 inclusive is very similar to that shown in Figures 1 to 4 inclusive except that the conical drum as 4' and gear as 3' are inverted and that the lower bar, as 6' and upper bar, as 5' are substantially parallel and are both provided with apertured lugs —7'— and —8'— for securing the device to and between the spaced supporting bars on Pullman type cars, and that the pinion as 2' is partially enclosed in a housing —30— and is provided with a relatively long vertical hub —31— for engagement with the angular portion as —32— of the operating staff as —11'— which is held against upper displacement by a key, 12'.

The spindle, as 13', is secured by a pin, —15'— to the lower bar, —6'—, and constitutes a journal bearing for the drum —4'—, which is provided with an eccentric arm, —16'— and a spiral bearing, —17'—, the radius of which gradually reduces toward the upper end of the drum for receiving a chain-cable, —18'—.

The outer end of the arm —16'— is provided with a horizontal slot —19'—, extending transversely of a bolt-opening —20'— for receiving a link of the chain —18'—, which is held in the slot by a bolt —21'—, having a head —22'— at its lower end, the lower end of said bolt-opening being enlarged at —23'—, to receive the bolt-head —22'—.

The enlargement, —23'—, is provided with a lateral branch opening —24'—, to receive the bolt-head, which is held against upward displacement by a key or pin, —27'—.

What I claim is:

1. A car brake operating mechanism comprising a conical drum having intersecting openings extending, respectively, through the periphery and through one end of the drum, said drum having a branch opening leading laterally from the second named opening some distance from said end, means for rotating said drum, a cable having an attaching end inserted in the first named opening, a headed bolt inserted through the second named opening and said attaching end of the cable and movable radially to bring its head into the branch opening so that the outer wall of said branch opening may hold the bolt against endwise displacement when the parts are adjusted for use.

2. A car brake operating mechanism comprising a conical drum having its larger end provided with an axially extending bolt opening through its end face and also provided with a radial slot extending from its periphery across the bolt opening to receive a cable, means for rotating the drum, a cable having an eye inserted in said slot, and a bolt inserted in the bolt opening and through the eye of the cable, said bolt opening having a radially extending branch some distance from the larger end face of the drum to allow the bolt to be shifted radially into and out of registration with end face opening and to form a ledge extending across the outer end face of the head for holding the bolt against endwise displacement when adjusted for use.

3. A car brake operating mechanism comprising a conical drum having an axially extending bolt opening through its larger end face, a portion of the opening some distance from said end face being elongated radially beyond the portion which extends through said end face to form an abutment for the adjacent end of the bolt, a bolt inserted in said opening and slidable radially therein across the abutment to prevent endwise displacement of the bolt, and a brake operating cable attached to said bolt.

4. A car brake operating mechanism comprising a rotary drum having an eccentric arm provided with a link-receiving slot extending inwardly from its outer end face toward the axis, said arm being also provided with a radially elongated bolt-receiving-slot extending axially across the link-receiving-slot some distance inwardly from the outer end of the arm, a link slidable radially in the first named slot to register its opening with the second named slot, and a bolt slidable radially in the second named slot and extending through the link.

5. A car brake operating mechanism comprising a rotary drum having an eccentric arm provided with a link-receiving slot extending inwardly from its outer end face toward the axis, said arm being also provided with a radially elongated bolt-receiving slot extending axially across the link-receiving slot some distance inwardly from the outer end of the arm, a link slidable radially in the first named slot to register its opening with the second named slot, and a bolt slidable radially in the second named slot and extending through the link, a portion of the bolt-receiving slot between the link-receiving slot and one of the end faces of the eccentric arm of the drum being enlarged to receive the head of the bolt, said bolt having a head slidable in the enlarged portion of its slot.

6. A car brake operating mechanism comprising a rotary drum having an axially extending bolt opening through one end, a portion of said opening some distance from said end being elongated radially, a bolt inserted in said opening and shiftable laterally into the radially elongated portion thereof and a brake operating cable attached to said bolt.

7. A car brake operating mechanism comprising a conical drum having a cam at its larger end and also provided with an axially extending bolt opening through its larger end face, a portion of said opening some distance from said end face being elongated radially in the direction of extension of the cam, a bolt inserted in said opening and movable laterally into the radially elongated portion of the opening, a cable attached to said bolt and engaged by said cam as the cable is wound upon the drum, and means for rotating the drum.

In witness whereof I have hereunto set my hand this 19th day of February 1921.

WILLIAM D. BREWSTER.

Witnesses:
H. E. CHASE,
M. R. COOKE.